United States Patent [19]

Kilburg et al.

[11] Patent Number: 5,231,140
[45] Date of Patent: Jul. 27, 1993

[54] PREPARATION OF POLYMERS WITH SIDE GROUPS WITH NLO ACTIVITY, AND THE USE THEREOF

[75] Inventors: Heike Kilburg, Speyer; Karl-Heinz Etzbach, Frankenthal; Karin H. Beck, Ludwigshafen; Peter Strohriegl, Hummeltal; Harry Mueller, Muenchberg; Oskar Nuyken, Munich, all of Fed. Rep. of Germany

[73] Assignee: BASF Aktiengesellschaft, Ludwigshafen, Fed. Rep. of Germany

[21] Appl. No.: 886,918

[22] Filed: May 22, 1992

[30] Foreign Application Priority Data

May 22, 1991 [DE] Fed. Rep. of Germany ....... 4116594

[51] Int. Cl.$^5$ ............................................. C08F 8/14
[52] U.S. Cl. ..................................... 525/274; 525/282; 525/286; 525/289; 525/293; 525/279; 525/295; 525/309; 525/366; 525/376; 525/377; 525/380; 525/329.8; 525/329.9; 525/330.1; 525/330.2
[58] Field of Search ............... 525/376, 366, 377, 380, 525/274, 282, 286, 289, 293, 295, 309, 279

[56] References Cited

U.S. PATENT DOCUMENTS

| | | | |
|---|---|---|---|
| 4,894,263 | 1/1990 | Dubois et al. | 428/1 |
| 4,935,292 | 6/1990 | Marks et al. | 428/220 |
| 4,999,401 | 3/1991 | Wreesmann et al. | 525/279 |
| 5,036,142 | 7/1991 | Wu | 525/348 |

FOREIGN PATENT DOCUMENTS

| | | |
|---|---|---|
| 0334176 | 9/1989 | European Pat. Off. |
| 0337405 | 10/1989 | European Pat. Off. |
| 0396172 | 11/1990 | European Pat. Off. |
| 0482985 | 4/1992 | European Pat. Off. |
| 2630744 | 11/1989 | France |

OTHER PUBLICATIONS

*European Polymer Journal;* Shibaev et al.; vol. 18, pp. 651–659; 1982; "Thermotropic Liquid-Crystalline Polymers-VI*".

Dr. D. R. Robello, "Journal of Polymer Sciences Part A" Polymer Chemistry, vol. 28, pp. 1–13 (1990).

*Primary Examiner*—Joseph L. Schofer
*Assistant Examiner*—Mark Nagumo
*Attorney, Agent, or Firm*—Keil & Weinkauf

[57] ABSTRACT

The invention relates to a process for the preparation of (meth)acrylate polymers with side-chain, non-linear optical chromophores and molecular weights of from 5000 to 5000000, which comprises reacting polymers of (meth)acryloyl chloride in solution with D-ω-hydroxyalkyl chromophores of the formula (I) or the alcoholates thereof

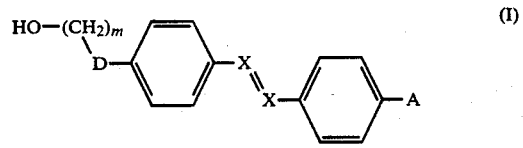

where
  D is an electron donor,
  A is an electron acceptor,
  X is CH and/or N, and m is from 2 to 11.

The polymers can be used in optical components.

8 Claims, No Drawings

PREPARATION OF POLYMERS WITH SIDE GROUPS WITH NLO ACTIVITY, AND THE USE THEREOF

The present invention relates to a process for the preparation of (meth)acrylate polymers with side-chain, non-linear optical chromophores and molecular weights of from 5000 to 5000000, to the polymers obtained by this process and to the use thereof in optical components, especially in communications technology.

Polymers with side-chain non-linear optical chromophores and the preparation thereof by free radical polymerization of ethylenically unsaturated organic compounds (methacrylic and acrylic compounds) which have non-linear optical (=NLO) chromophores as side groups have been disclosed and are described, for example, by D. R. Robello in J. Polym. Sci; Part A: Polymer Chemistry 28 (1990) 1 and in EP-A-0,337,405, EP-A-0,334,176, EP-A-0,396,172, FR-A-2,630,744 and FR-A-2,597,109.

The free radical polymerization of monomers with NLO side groups results, however, as a consequence of the retarding action of nitro and azo groups, only in products with relatively low molecular weights of up to about $\overline{M}_n = 25000$. Another disadvantage is that such products cannot be prepared with satisfactory reproducibility. It is true that U.S. Pat. No. 4,935,292 has disclosed functionalized polymers which have non-linear optical properties and are obtained by reaction of polystyrene, first by chloromethylation and then conversion into the more reactive iodomethyl derivative which is finally etherified with the thallium salt of an alcohol chromophore, or is quaternized by reaction with a pyridinium chromophore. Also mentioned herein is the functionalization of poly(p-hydroxystyrene), where the chromophore is linked via an ether group to the poly(p-hydroxystyrene) by a nucleophilic substitution of the phenolate ion of poly(p-hydroxystyrene) on the tosylate of the chromophore. The methods described in U.S. Pat. No. 4,935,292 for preparing polymers with non-linear optical properties are rather elaborate and, because of the toxicity of thallium, require extensive protective measures. In addition there are limitations on the molecular weights which can be achieved for the polymers and on the nature of the polymers. Besides said polymethacrylates, the polyacrylates can also be obtained by reactions on the polymers. However, the U.S. patent gives no information on the molecular weight distribution and the reproducibility of the polymers described therein.

It is an object of the present invention to indicate a process for the preparation of (meth)acrylate polymers with side-chain non-linear optical chromophores which has to a considerably reduced extent or not at all the abovementioned disadvantages of the prior art and which is straightforward, has high reproducibility and provides materials with a high molecular weight and a narrow molecular weight distribution.

We have found that this object is achieved by a process for the preparation of (meth)acrylate polymers with side-chain, non-linear optical chromophores and molecular weights $\overline{M}_n$ of from 5000 to 5000000, which comprises reacting polymers of (meth)acryloyl chloride in solution with D-ω-hydroxyalkyl chromophores of the formula (I) or the alcoholates thereof

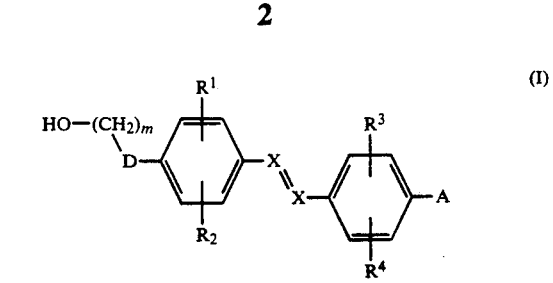

where
D is an electron donor,
A is an electron acceptor,
$R^1$, $R^2$, $R^3$ and $R^4$ can be identical or different and are H, alkyl of 1 to 6 carbons, cycloalkyl of 5 or 6 carbons, or $R^3$ and $R^4$ are CN, $NO_2$, or CHO, or $R^1$ and $R^2$, or $R^3$ and $R^4$, together form a fused-on ring,
X is CH and/or N, and
m is an integer from 2 to 11.

The non-linear optical D-ω-hydroxyalkyl chromophores of the formula (I) or the alcoholates thereof preferably employed are those in which m is an integer from 2 to 8.

The preferred alcoholates of these chromophores are the alkali metal alcoholates, especially the lithium alcoholates.

An advantageous embodiment of the process according to the invention comprises reacting the non-linear optical D-ω-hydroxyalkyl chromophores of the formula (I) or the alcoholates thereof with polyacryloyl chloride or polymethacryloyl chloride.

Another embodiment of the process according to the invention comprises carrying out the reaction of the alcohols of the formula (I) or of the alcoholates thereof with the (meth)acryloyl chloride polymers in such a way that chloroformyl groups are still present in the polymer after the reaction and can subsequently be hydrolyzed to carboxyl groups or otherwise functionalized in another reaction.

It is moreover possible for chloroformyl groups still present in the polymer after the reaction to be reacted with crosslinkable alcohols or crosslinkable alcoholates, examples being those with the following groups bonded to the oxygen:

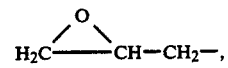

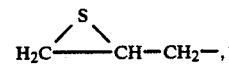

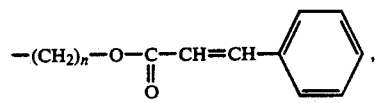

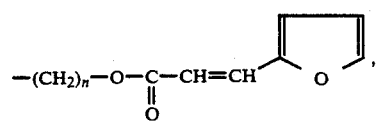

-continued

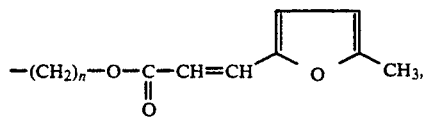

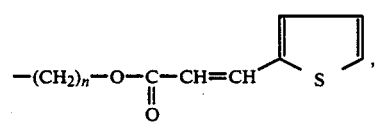

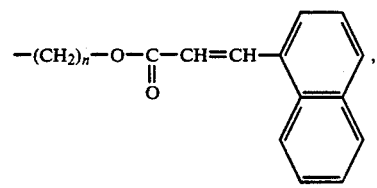

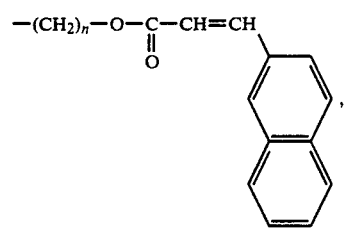

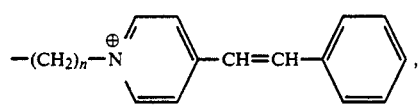

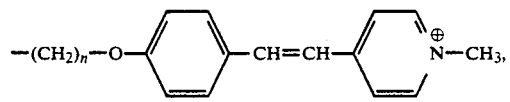

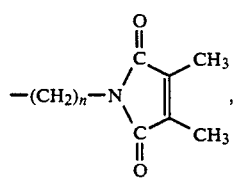

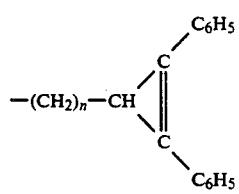

or

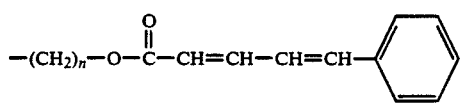

where n is from 1 to 12.

The present invention also relates to polymers which contain or are composed of repeating units of the formula (II)

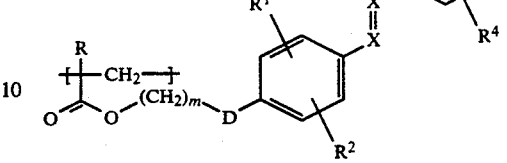

(II)

where D, A, X, m, $R^1$, $R^2$, $R^3$ and $R^4$ have the meanings specified for formula (I), and R is hydrogen or methyl, and which have been prepared by the process according to the invention. The polymers prepared according to the invention can contain as electron donor groups D an oxygen atom or a group $NR^5$ where $R^5$ is $C_1$-$C_6$-alkyl or -alkenyl, $C_5$-$C_7$-cycloalkyl, phenyl, benzyl, tolyl or a crosslinkable group, especially a vinylic, acrylic, methacrylic, oxiranylic or thiiranylic group, as —X=X— —N=N13 , —N=CH—, —CH=N— or —CH=CH—, as electron acceptor A H, $NO_2$, CN, 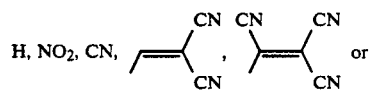

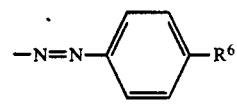

where $R^6$ is H, $NO_2$, CN or CHO.

The polymers prepared according to the invention can be composed only of repeating units of the formula (II) or they may, in addition to the repeating units of the formula (II), also contain other repeating comonomer units.

The present invention also relates to the use of the non-linear optical polymers prepared according to the invention in optical components and to the use thereof in communications technology.

The process according to the invention is particularly distinguished in that non-linear optical polymers of high molecular weight can be prepared very reproducibly in this way.

High molecular weights are desirable because only they result in high quality films as needed for applications in non-linear optics. In addition, the relaxation of the groups with NLO activity after alignment in the electrical field is distinctly diminished with polymers of high molecular weight.

Whereas the preparation of polymerizable ethylenically unsaturated monomeric compounds with non-linear optical chromophore groups is very complicated, particularly in terms of their purification, which must be done by column chromatography and subsequent recrystallization with considerable expenditure of time and materials (large quantities of solvents used), it is much simpler to purify the basic alcohols containing chromophore groups, which can be obtained virtually analytically pure by simple recrystallization, for example from toluene or pyridine/ethanol (1:4). Even if these alcohols still contain small amounts of impurities, they can be employed for the reaction with the polymers without disadvantageous effects on the products, which is a particular advantage for the preparation of the products on the industrial scale.

The following specific details are given on the process according to the invention.

Homo- and copolymers of acryloyl or methacryloyl chloride can be prepared quantitatively from the monomers by conventional processes, for example by free radical polymerization in solution. Suitable solvents are conventional organic solvents, eg. ethers such as dioxane or tetrahydrofuran, dimethylformamide, N-methylpyrrolidone, aromatic hydrocarbons, e.g. benzene or toluene, and chlorobenzene and mixtures thereof.

Comonomers suitable for copolymerization in virtually any ratio with (meth)acryloyl chloride are esters of acrylic and methacrylic acid with alcohols containing 1 to 18, preferably 1 to 8, carbon atoms, such as methyl methacrylate, ethyl acrylate, n- and i-butyl acrylate, hexyl acrylate, 2-ethylhexyl acrylate, and vinylaromatic compounds such as styrene, or else other ethylenically unsaturated compounds which are copolymerizable with (meth)acryloyl chloride, and mixtures of such copolymerizable ethylenically unsaturated compounds. It is expedient to purify the monomers by conventional methods, e.g. by distillation or recrystallization, before the polymerization. The homo- or copolymerization of (meth)acryloyl chloride is normally carried out in the presence of free radical catalysts such as azodiisobutyronitrile or peroxides such as dibenzoyl peroxide or dilauryl peroxide.

The properties and molecular weights of the (meth)acryloyl chloride polymers can be adjusted as required by appropriate choice of the nature and amount of comonomers and of the polymerization conditions such as temperature, solvent quantity or amount of catalysts in a way familiar to the person skilled in the art.

It is particularly advantageous to adjust the molecular weights of these polymers to the range of $\overline{M}_n$ of from 20 000 to 500 000, in particular from 30 000 to 100 000.

The (meth)acryloyl chloride polymers can be isolated in a conventional manner by precipitation of their solutions in anhydrous solvents such as methanol, tetrahydrofuran or hexane, followed by drying.

The polymers of (meth)acryloyl chloride are reacted according to the invention in solution with D-ω-hydroxyalkyl chromophores of the formula (I) or the alcoholates thereof

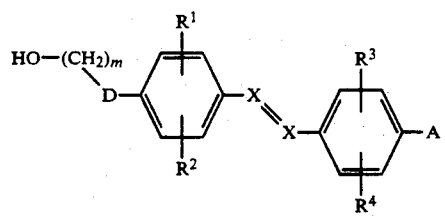

where
D is an electron donor,
A is an electron acceptor,
X is CH and/or N,
$R^1$, $R^2$, $R^3$ and $R^4$ can be identical or different and are H, alkyl of 1 to 6 carbons, cycloalkyl of 5 or 6 carbons, or $R^3$ and $R^4$ are CN, $NO_2$ or CHO, or $R^1$ and $R^2$, or $R^3$ and $R^4$, together form a fused-on ring, and
m is an integer from 2 to 11, preferably from 2 to 8, where the alcoholates are preferably the alkali metal alcoholates, especially the potassium or lithium alcoholates, which can be obtained in a conventional manner by reacting the D-ω-hydroxyalkyl chromophores with a strong base, e.g. with potassium tert-butylate or sodium methylate in anhydrous solution, for example in tetrahydrofuran (=THF) or dioxane.

After room temperature has been reached it is possible to carry out the reaction with the homopolymer of (meth)acryloyl chloride or with the copolymer of (meth)acryloyl chloride and methyl methacrylate. The polymers can, for example, be precipitated in methanol/HCl and reprecipitated three times from THF/methanol.

Direct esterification of the alcohols by reaction of the polymers in the presence of an esterification catalyst, eg. with dimethylaminopyridine, also gives the required products.

The electron donor D in the formula (I) for the D-ω-hydroxyalkyl chromophores can be oxygen or $NR^5$ where $R^5$ is alkyl of 1 to 6 carbons, for example methyl, ethyl, buty or hexyl, $C_1$-$C_6$-alkenyl, e.g. allyl or hexenyl, cycloalkyl of 5 to 7 carbons such as cyclohexyl, phenyl, benzyl, tolyl or a crosslinkable group such as a vinylic, acrylic, methacrylic, oxiranylic or thiiranylic group, for example

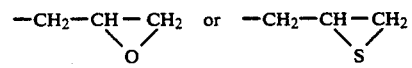

The electron acceptor A in the formula (I) can be hydrogen, $NO_2$, CN, or CHO or one of the groups

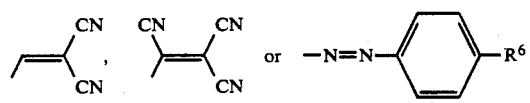

where $R^6$ is H, $NO_2$, CN or CHO.

$R^1$, $R^2$, $R^3$ and $R^4$ in the formula (I) or (II) can be hydrogen, alkyl of 1 to 6 carbon atoms, for example methyl, ethyl, isopropyl, n-butyl, Isobutyl or hexyl, cycloalkyl of 5 or 6 carbon atoms, such as cyclohexyl, or $R^1$ and $R^2$, or $R^3$ and $R^4$, can together form a fused-on ring, e.g. naphthyl.

Examples of such D-ω-hydroxyalkyl chromophores are

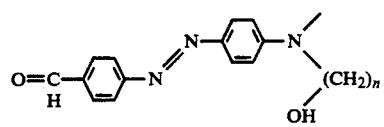

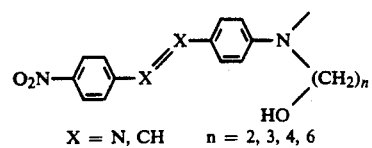

X = N, CH    n = 2, 3, 4, 6

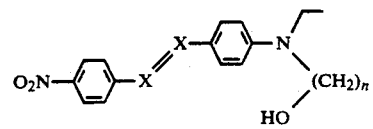

-continued
X = N, CH    n = 2, 3, 4, 6

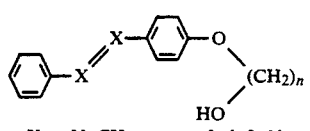

X = N, CH    n = 3, 6, 8, 11

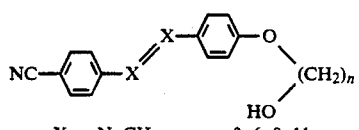

X = N, CH    n = 3, 6, 8, 11

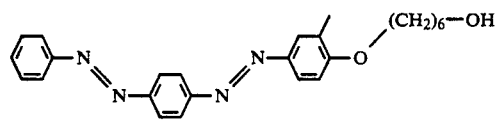

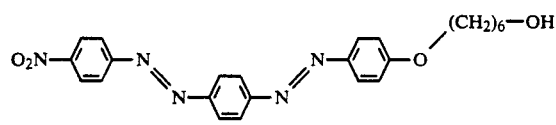

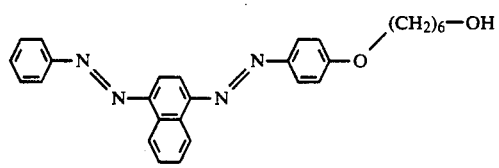

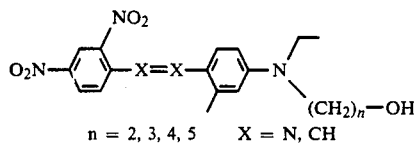

n = 2, 3, 4, 5    X = N, CH

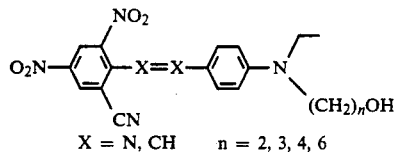

X = N, CH    n = 2, 3, 4, 6

Another advantage of the process according to the invention is the possibility of preventing the relaxation of the functional groups, specifically by the crosslinking of the polymer following polarization. The introduction of crosslinkable groups into a polymethacrylate is much more straightforward than corresponding terpolymerization.

Examples of possible $R^5$ groups of the above-mentioned types suitable for the crosslinking are

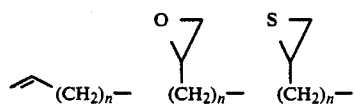

and the groups derived from cinnamic acid, styrene, maleimide and cyclopropene as mentioned above.

Examples of prepolymer compositions which can be employed for the reaction with the chromophore alcoholates are

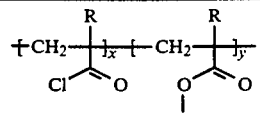

| x | y |
|---|---|
| 1,0 | 0,0 |
| 0,5 | 0,5 |
| 0,4 | 0,6 |
| 0,3 | 0,7 |
| 0,2 | 0,8 |
| 0,1 | 0,9 |

The process according to the invention can be used to synthesize exactly defined prepolymers with high molecular weights and a narrow molecular weight distribution, and high glass transition temperatures are achieved.

Further advantages of the process according to the invention are the great reproducibility in the preparation of the polymers, the easier preparation because of the smaller number of purification steps on the ω-hydroxyalkyl chromophores, the speed of the reaction, the saving of solvents because no column chromatography is necessary, and the ease of further functionalization, i.e. introduction of further functional groups.

In the following examples, parts and percentages are by weight unless otherwise specified.

Preparation of various prepolymers by free radical polymerization:

(I): $x=1.0$ $y=0.0$

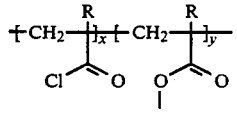

24.15 g (0.25 mol) of freshly distilled methacryloyl chloride, 0.41 g (0.0025 mol) of azodiisobutyronitrile (=AIBN) and 25 ml of dioxane are introduced into a 100 ml Schlenk tube. The solution is carefully degassed and then polymerized at 60° C. for 48 hours. To work up, the viscous solution is diluted with dioxane, and the polymer is precipitated by pouring the solution into dry hexane. The product is filtered off with suction and stored under nitrogen in order to avoid hydrolysis of the chloroformyl groups.

Yield: 21 g (81%) of white powder

IR (film): 2996, 2975, 1786, 1483, 1446, 1393, 960, 851 cm$^{-1}$.

Elemental analysis: $(C_4H_5OCl)_n$ 104.54: calculated: C, 45.96; H, 4.82; O, 15.30; Cl, 33.91 found: C, 46.90; H, 5.00; O, 15.3; Cl, 33.0

GPC: $M_n=33\,000$; $M_w=68\,000$; $M_w/M_n=2.1$ (II): $x=0.2$; $y=0.8$ 4.8 g (0.05 mol) of methacryloyl chloride, 21.2 g (0.2 mol) of methyl methacrylate and 0.41 g (0.0025 mol) of AIBN are dissolved in 100 ml of dioxane in a Schlenk tube and, after degassing, polymerized at 60° C. for 48 hours. To work up, the product is precipitated in dry hexane.

Yield: 22 g (88%) of white powder

IR (film): 2997, 2951, 1788, 1730, 1485, 1448, 1435, 1244, 1194, 1152, 964, 847, 756 cm$^{-1}$.

Elemental analysis: calculated: C, 57.18; H, 7.40; O, 28.63; Cl, 6.78 found: C, 57.21; H, 7.33; O, 28.5; Cl, 6.75 GPC: $M_n=35\ 000$; $\overline{M}_w=85\ 000$; $M_w/M_n=2.43$

EXAMPLE 1

Reaction of the Prepolymer (x =0.1, y=0.9) with the Chromophore

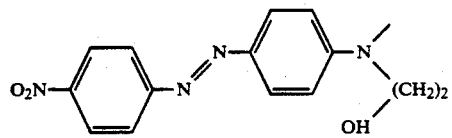

13.5 ml (0.013 mol) of potassium tert-butylate (1 molar solution in THF) are added to a solution, cooled in ice, of 4.23 g (0.014 mol) of 4-(N-hydroxyethyl-N-methylamino) -4'-nitroazobenzene in 300 ml of dry tetrahydrofuran (=THF). The mixture is subsequently stirred for 1 hour and then 9.5 g (0.9 mol of COCl groups) of a copolymer of 90% methyl methacrylate (=MMA) and 10% methacryloyl chloride dissolved in 150 ml of THF are added dropwise, and the mixture is left to stir at room temperature overnight. The polymer is precipitated in acidified methanol and further purified by reprecipitation three times from THF in methanol.

Yield: 10.2 g (85%)

IR (film): 1732, 1601, 1589, 1520, 1485, 1441, 1340, 1242, 1150, 990, 858, 754, 667 cm$^{-1}$.

Elemental analysis: calculated: C, 60.55; H, 7.31; N, 4.41; O, 27.73; Cl,— found: C, 60.28; H, 7.40; N, 3.98; O, 27.90; Cl, 0.07 GPC: $M_n=40\ 000$; $M_w=95\ 000$; $M_w/M_n=2.4$

EXAMPLE 2

0.005 mol of potassium tert-butylate (1 molar solution in THF) is added dropwise to a solution of 1.47 g (0.005 mol) of 4-(6-hydroxyhexyloxy)azobenzene in 20 ml of dry THF. Subsequently 0.31 g (0.003 mol) of polymethacryloyl chloride in 10 ml of THF is added, and the mixture is left to stir at room temperature over-night. The polymer is precipitated in methanol and subsequently reprecipitated three times from THF in methanol.

Yield: 0.8 g (73%)

IR (film): 1726, 1602, 1582, 1503, 1260, 1142, 839, 768, 687 cm$^{-1}$.

Elemental analysis: calculated: C, 72.11; H, 7.15; N, 7.64; O, 13.10; Cl,— found: C, 70.01; H, 7.18; N, 7.49; O, 13.8; Cl, 0.1

GPC: $M_n=56\ 100$; $M_w=131\ 800$; $M_w/M_n=2.3$

EXAMPLE 3

A solution of 0.51 g (0.005 mol) of copolymer (x=0.2; y=0.8; corresponds to 0.001 mol of chloroformyl groups) in 30 ml of dioxane is added at room temperature to a stirred solution of 0.71 g (0.002 mol) of 4-(N-hydroxyhexyl-N-methylamino)-4'-nitroazobenzene in 30 ml of anhydrous dioxane with exclusion of water under a nitrogen atmosphere. 0.5 g (0.004 mol) of dimethylaminopyridine (DMAP) in 4.5 ml (0.056 mol) of pyridine is added dropwise and then the mixture is refluxed. Reaction is virtually quantitative after 2 days, and the solution is precipitated in a mixture of 300 ml of methanol and 1 ml of concentrated hydrochloric acid, and the polymer is filtered off with suction, dried in a desiccator and reprecipitated three times from THF in methanol.

Yield: 0.7 g (90%) of red polymer

IR (film): 1805, 1759, 1730, 1601, 1587, 1518, 1449, 1381, 1244, 1138, 856, 756, 691 cm$^{-1}$.

Elemental analysis: calculated: C, 62.61, H,7.33., O,23.27.,N, 6.79; Cl -found: C, 62.50; H, 7.26; O, 23.02; N, 6.66; Cl, 0.27

EXAMPLE 4

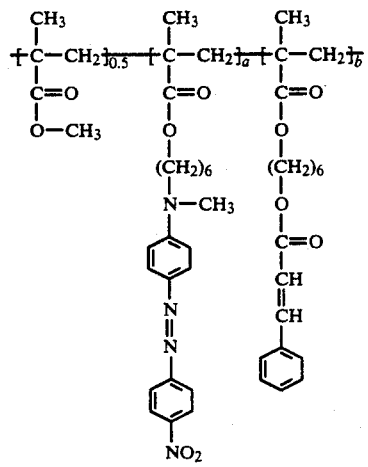

A solution of 1.02 g (10 mmol) of copolymer of methacryloyl chloride and methyl methacrylate (molar ratio 1:1) (M=102.33 g/mol) (corresponds to 5 mmol of chloroformyl groups) in 10 ml of dioxane is added at room temperature to a stirred solution of 1.78 g (5 mmol) of 4-(N-hydroxyhexyl-N-methylamino)-4'-nitroazobenzene (M=356.43 g/mol), 1.24 g (5 mmol) of 6-hydroxyhexyl cinnamate and 10 ml (124 mmol) of pyridine in 20 ml of anhydrous dioxane with exclusion of water under a nitrogen atmosphere. The solution is refluxed and, after 1 day, 1.22 g (10 mmol) of DMAP are added. Reaction is virtually quantitative after a total of 2 days, and the solution is precipitated in a mixture of 300 ml of methanol with 2 ml of concentrated hydrochloric acid, and the polymer is filtered off with suction, dried in a desiccator and reprecipitated three times from THF in methanol. The result is 1.5 g (64%) of polymer.

IR (film): 1805 and 1759 (anhydride), 1728 (—C=O), 1638 (C=C of the cinnamyl radical), 1601, 1587, 1518, 1451, 1383, 1256, 1169, 1138, 1103, 993, 858, 756 cm$^{-1}$.

GPC: $M_n=20\ 800$; $M_w=55\ 400$; $M_w/M_n=2.7$

EXAMPLE 5

Thin layers of the polymers with NLO activity prepared as in Examples 2 and 3 are applied by spincoating 20% strength solutions onto substrates which are provided with a transparent electrode. After the coating has dried, another transparent electrode is attached. The sandwich specimens prepared in this way are polarized at the softening point and then cooled to room temperature and tested for the modulation of birefringence. Conventional computations are used to determine the damping and the electrooptical coefficients. The specimens prepared in this way have good electrooptical coefficients and thus can be used in novel nonlinear optical arrangements.

We claim:

1. A process for the preparation of (meth)acrylate polymers with side-chain, non-linear optical chromophores and molecular weights $M_n$ of from 5000 to 5000000, which comprises reacting polymers of (meth)acryloyl chloride in solution wint D-ω-hydrozyalkyl chromophores of the formula (I) or the alcholates thereof

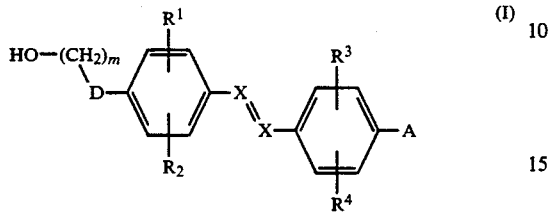

where
D is an electron donor,
A is an electron acceptor,
$R^2$ and $R^3$ can be identical or different and are H, alkyl of 1 to 6 carbons, cycloalkyl of 5 or 6 carbons, or $R^3$ and $R^4$ are CN, $NO_2$ or CHO, or $R^1$ and $R^2$ and $R^4$, together form a fused-on ring,
X is CH and/or N,
m is an integer from 2 to 11, and wherein the reaction of the alcohols of the formula (I) or of the alcoholates thereof with the (meth)acryloyl chloride polymers is carried out in such a way that chloroformyl groups are still present in the polymer after the reaction and can subsequently be hydrolyzed to carboxyl groups or otherwise functionalized.

2. The process of claim 1, wherein the non-linear optical D-ω-hydroxyalkyl cromophores of the formula (I), or the alcoholates thereof, which are employed are thsoe in which m is an integer from 2 to 8.

3. The process of claim 1, wherein the alkali metal alcoholates of the non-linear optical D-ω-hydroxyalkyl chromophores of the formula (I) are employed as alcoholates in the reaction.

4. The process of claim 3, wherein the lithium alcoholates are employed as alkali metal alcoholates in the reaction.

5. The process of claim 1, wherein non-linear optical D-ω-hydroxyalkyl chromophores of the formula (I) or the alcoholates thereof are reacted with polyacryloyl chloride.

6. The process of claim 1, wherein non-linear optical D-ω-hydroxyalkyl chromophores of the formula (I) or the alcoholates thereof are reacted with polymethacryloyl chloride.

7. The process of claim 1, wherein the chloroformyl groups still present in the polymer after the reaction are reacted with crosslinkable alcohols or crosslinkable alcoholates.

8. The process of claim 7, wherein the crosslinkable alcohols or crosslinkable alcoholates are those which contain the following groups bonded to the oxygen:

$CH_2=CH-CH_2-$,

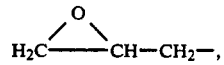

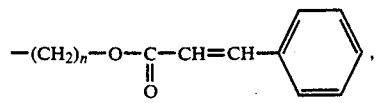

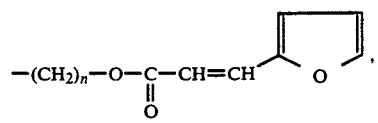

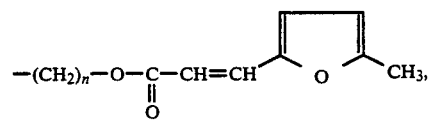

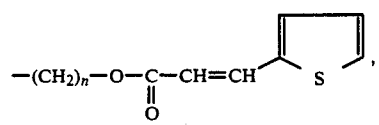

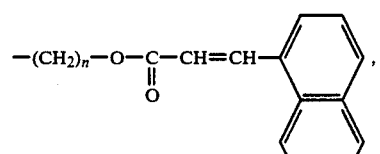

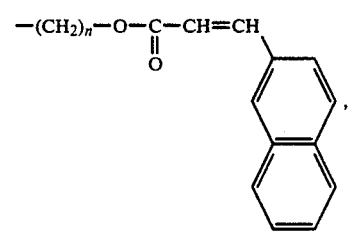

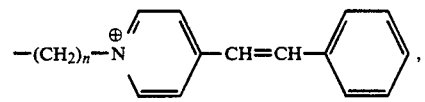

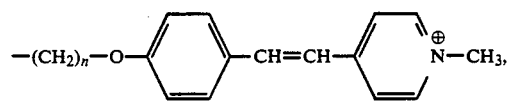

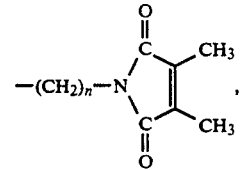

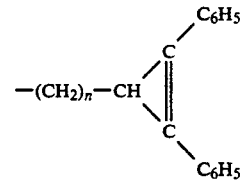

or

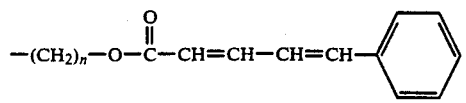

where n is from 1 to 12.

UNITED STATES PATENT AND TRADEMARK OFFICE
CERTIFICATE OF CORRECTION

PATENT NO. : 5,231,140

DATED : July 27, 1993

INVENTOR(S) : KILBURG et al.

It is certified that error appears in the above-identified patent and that said Letters Patent is hereby corrected as shown below:

Claim 1, column 11, line 5, "wint" should be --with--.

column 11, line 6, "alcholates" should be --alcoholates--.

column 11, line 21, before "$R^2$" there should be --$R^1$--.

Claim 2, column 11, line 37, "thsoe" should be --those--.

Signed and Sealed this

Fourth Day of October, 1994

*Attest:*

BRUCE LEHMAN

*Attesting Officer*  *Commissioner of Patents and Trademarks*